Patented July 22, 1941

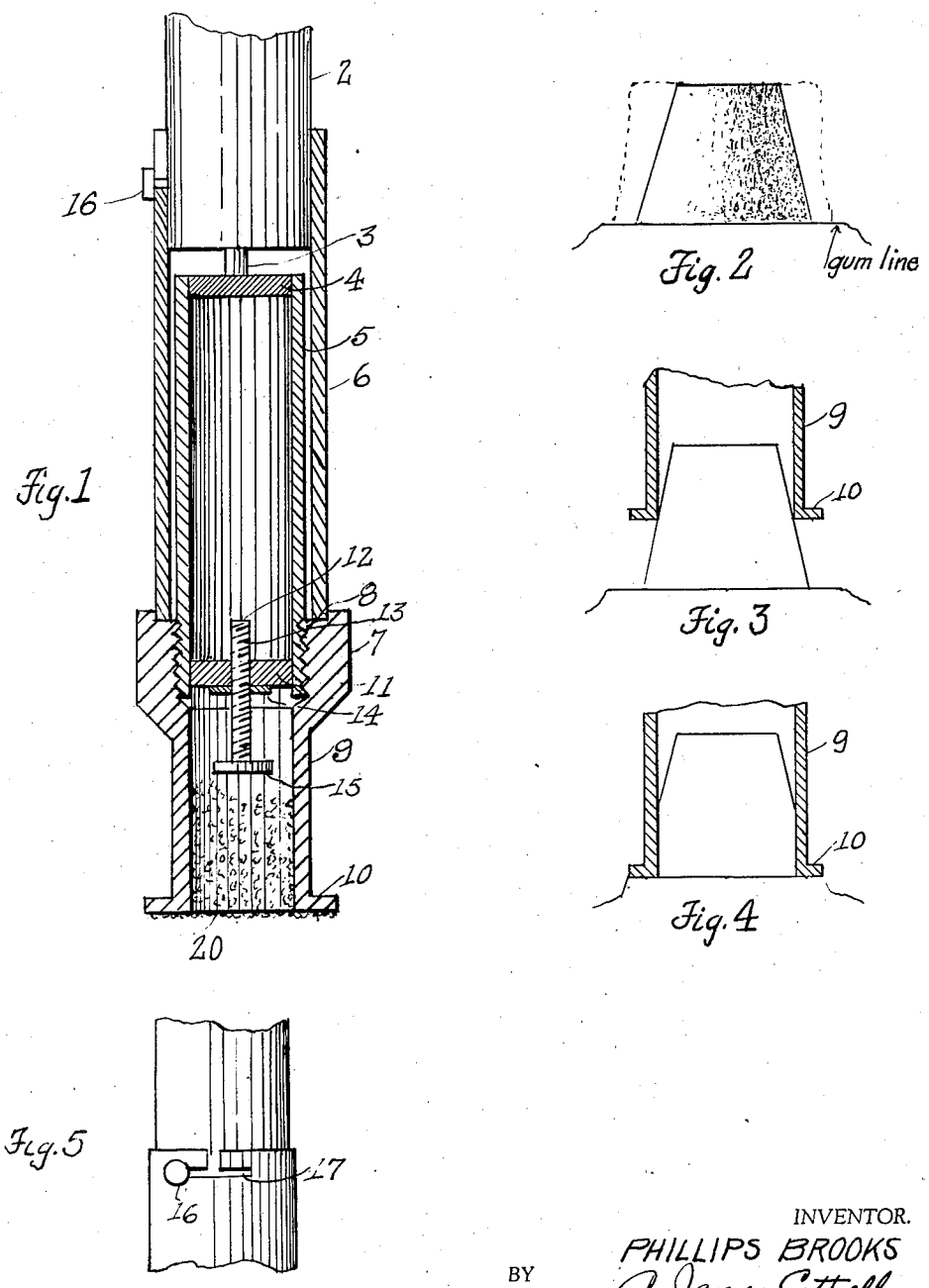

2,250,058

UNITED STATES PATENT OFFICE 2,250,058

DENTAL IMPLEMENT

Phillips Brooks, New York, N. Y.

Application April 8, 1940, Serial No. 328,390

2 Claims. (Cl. 32—48)

This invention relates to improvements in dental implements; and more particularly to the provision of a device for facilitating and enabling the more accurate preparation of teeth to receive porcelain jacket crowns.

Heretofore, the preparation of a tooth to receive a porcelain jacket crown required considerable time and has been a somewhat painful and annoying procedure to the patient. It has been the practice to prepare the tooth by cutting it to a rough shape approximating the shape of the jacket by using the usual abrasive tools of the dentist. This obviously is a slow and tedious process and inaccurate. Absolute accuracy is practically impossible and frequently difficulty is encountered in fitting a jacket over a tooth prepared by the old methods. In the preparation of the tooth to receive a jacket crown, it is necessary to form a ledge at the base of the tooth to receive the crown. With the usual grinding and cutting tools employed by a dentist, the formation of such a ledge accurately is extremely difficult and requires unusual skill.

It is, therefore, an object of this invention to provide a device for rapidly and conveniently shaping a tooth to enable the accurate fitting of a porcelain jacket crown thereon.

A further object is the provision of a device for rapidly and accurately shaping teeth to receive porcelain jacket crowns, which device can be readily and conveniently attached to and operated by the usual dental engine.

These and other objects are attained by the novel construction, combination and arrangement of parts hereinafter described and shown in the accompanying drawing, constituting a material part of this disclosure, and in which:

Fig. 1 is a sectional view of a device embodying my invention.

Fig. 2, Fig. 3 and Fig. 4 are diagrammatic views showing steps in the preparation of a tooth to receive a porcelain jacket crown.

Fig. 5 is a side view of a section of the device.

Referring to the drawing, in Fig. 1, there is shown a portion 2 of a common type of dental engine, which has therein a chuck receiving the short shaft 3 of my device. The lower end of shaft 3 has integral therewith a disc 4, which is fixed to the upper end of a cylindrical shaft 5, rotatably mounted in a casing 6.

The lower end of cylindrical shaft 5 is threaded and receives the threaded head 7 of a substantially cylindrical member 9, which has a groove 8 in the portion 7 receiving the lower end of casing 6. The member 9 has a flange 10 at its lower end, and the inner surface of the member 9 and the under surface of the flange 10 are coated with an abrasive material 20, such as diamond dust, carborundum, or the like.

In preparing a tooth to receive a porcelain jacket, the tooth is first shaped by the usual cutting and grinding implements to a shape somewhat as shown in Fig. 2. When so prepared, the tooth is not adapted to accurately receive a jacket, as the shape is inaccurate, and absolutely accurate formation of a proper shape by manual methods is practically impossible. After the tooth has been roughly shaped as shown in Fig. 2, the member 9 is applied thereto as shown in Fig. 3; and the member 9 accurately shapes the tooth and prepares a jacket supporting ledge on the tooth as shown in Fig. 4. Heretofore, the forming of a jacket supporting ledge on a tooth at the base thereof has been an extremely difficult operation and seldom accurate.

In order to limit the extent of cutting of the member 9, a disc 11 is fixed in the lower end of shaft 5 and has a threaded aperture receiving a screw 12 having threads 13. The screw is held in a definite position and prevented from turning by a lock nut 14. Attached to the lower end of the screw 12 is a disc 15 adapted to rest upon the top of a tooth and limit the downward movement of the cutting member 9.

In order to prevent rotation of the casing 6 during the operation of the device, a pin attached to the member 2 and having a head 16, is positioned in a bayonet slot 17 in the casing 6 as shown in Fig. 5.

In practice a dentist would have a series of members 9 of different sizes to accommodate different teeth. But in all cases an accurate finish will be produced to accurately receive a porcelain jacket crown.

While the device has been described especially in connection with the preparation of teeth to receive porcelain jacket crowns, it is obvious that it can be advantageously employed to prepare teeth to receive other types of crowns, and to shape teeth for other purposes. When it is desired to employ the device to prepare a tooth in the back of the mouth, an angular arranged driving attachment is provided to properly position the cutting member 9. Otherwise, the structure and operation of the device is the same.

The cutting member 9 has been herein described as being cylindrical; but obviously other shapes for the cutting member may be employed without departing from the spirit of the invention.

The foregoing disclosure is to be regarded as descriptive and illustrative only, and not restrictive or limitative of the invention, of which obviously embodiments may be constructed including modifications without departing from the general scope herein indicated and denoted in the appended claims.

Having thus described my invention, what I claim as new and desire to secure by Letters Patent is:

1. In a device for preparing a tooth to receive a poreclain jacket crown, a hollow member having an angularly directed flange at the free edge thereof, stop means to limit the downward movement of the hollow member on a tooth, and an abrasive material coating the inner wall of the member and said flange, said abrasive material being independent of the material from which the flange is made.

2. In a device for preparing a tooth to receive a porcelain jacket crown, a hollow member having an angularly directed flange at the free edge thereof, stop means to limit the downward movement of the hollow member on a tooth, and a coating of diamond dust on the inner wall and flange of said member.

PHILLIPS BROOKS.